No. 780,242. PATENTED JAN. 17, 1905.
R. J. STIRLING.
HARNESS.
APPLICATION FILED MAR. 17, 1903.
2 SHEETS—SHEET 1.
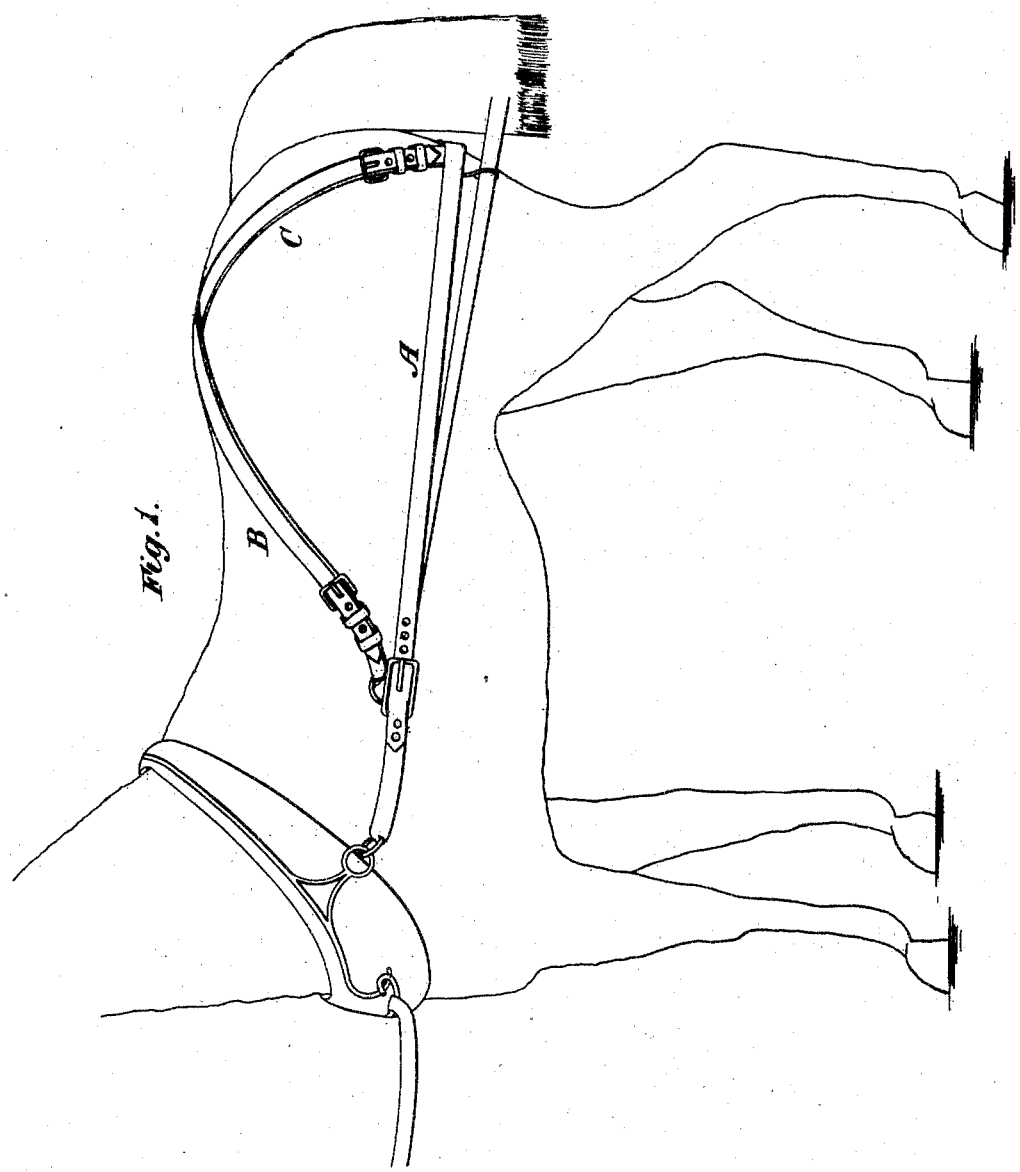

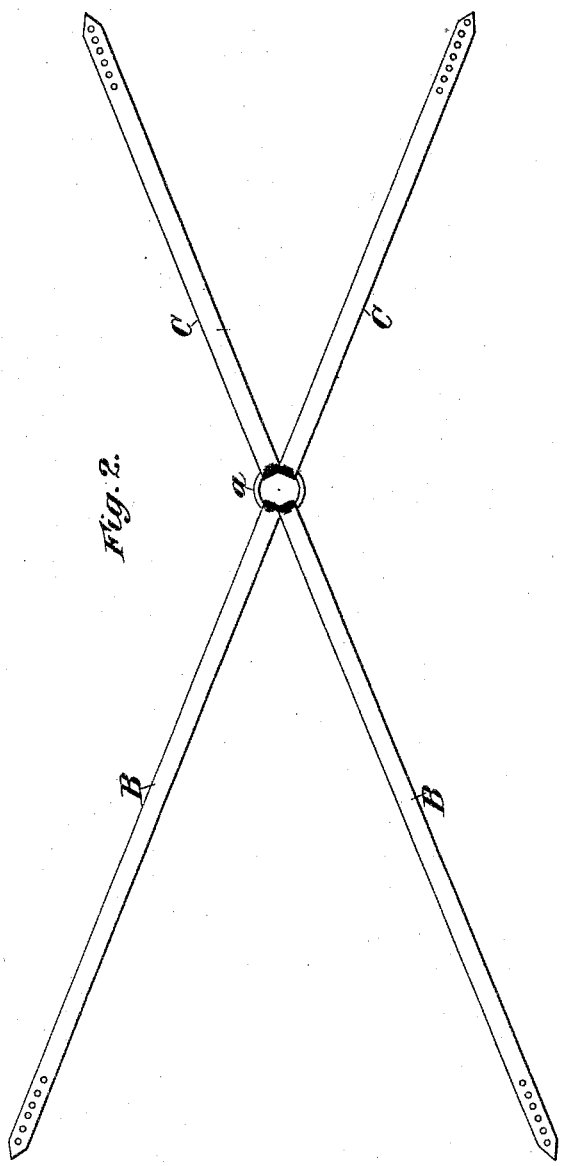

No. 780,242. Patented January 17, 1905.

UNITED STATES PATENT OFFICE.

ROBERT JOHNSTONE STIRLING, OF CHURCH CROOKHAM, NEAR ALDERSHOT, ENGLAND.

HARNESS.

SPECIFICATION forming part of Letters Patent No. 780,242, dated January 17, 1905.

Application filed March 17, 1903. Serial No. 148,256.

*To all whom it may concern:*

Be it known that I, ROBERT JOHNSTONE STIRLING, surgeon, a subject of the King of the United Kingdom of Great Britain and Ireland, and a resident of Church Crookham, near Aldershot, county of Hants, England, have invented certain new and useful Improvements in Harness, of which the following is a specification.

This invention relates to improvements in a holdback for pair-horse and team harness, also applicable for single harness, also applicable for collar or breastplate harness.

The object of my improvements is to bring into use an entirely new power in the use of harness. Hitherto practically all the leather upon horses' backs has been for the purpose of carrying the breech-strap, which strap in holding up loads the weight onto the horse's hind legs, and the weight of the animal's body for holding up is practically lost. In my improvements the weight of the load in holding up is withstood by the weight of the animal's body by the weight being conveyed almost in a direct line from the "pole-chains" or "pole-straps" over the horse's body to its quarters, which are gripped by the breech-strap and the rear limbs of my carriers or back-straps, as a ball pressed against the mesh of a net, or as the horse presses its shoulder into the collar and is assisted greatly in propulsion by the weight of its body behind. The breech-strap and its new carrier-limbs or back-strap thus share the work, and the horse's hind legs are left freer from strain and for movement, also relieving fore legs and withers. This breeching is adapted to any form of harness. In the case of shaft-harness the breeching is suitably attached to the shafts—viz., to the tugs or other fittings which carry the shafts or directly to the shafts. The combined advantages are greatly-increased power and avoidance of saddle, girth, and crupper galls to horses, lightness, economy in leather, and cost of manufacture. In double harness the usual pads and cruppers and all complicated straps may be done away with, and the work of harnessing and unharnessing is much simplified and quicker. In single harness no crupper is required. If a horse fall, it is easily and rapidly freed from the harness, and thus the risks from accidents lessened. Straps may be added for any special purpose.

Figure 1 is a side view of part of a horse, showing the attachment of the back-straps to the breeching. Fig. 2 is a plan of the back-straps or "limbs" of carrier, which may be attached in any suitable way at point of contact or crossing.

In accordance with my invention the breeching or breech-strap A is carried by the two straps B and C, which cross one another over the horse's back, as shown in Fig. 1. The rear portion of the strap B (the same with regard to the strap C) is suitably attached to the breech-strap A at about the middle of the horse's hip, the forward portion of the said strap being suitably attached to the breech-strap or to the trace near the middle of the horse's side—viz., horse's "girth," or farther forward. The straps B and C where they cross over the horse's quarters, as shown in Fig. 1, may be secured to one another, or the said straps may be secured to a ring, such as $a$, as shown in Fig. 2. In the case of heavy horse-wagons chain and other fittings are much used, so that the means of attaching the breeching must be suitable to the style of harness in use as to material and design of fittings.

I claim—

1. In a harness, the combination with a breech, of means for directing the weight of the animal's body to the breech during the holdback, comprising a pair of straps each strap extending across the back of the animal and having both its ends secured to the breech, the rear part of said straps forming with the intermediate part of the breech a triangle, the upper angle of which is approximately forty-five degrees.

2. In a harness, the combination with a breech, of means for directing the weight of the animal's body to the breech during the holdback, comprising a pair of straps extending across the back of the animal and secured together at their point of intersection, each of said straps having both its ends secured to the breech and the rear parts of said straps forming with the intermediate part of the breech a triangle the upper angle of which is approximately forty-five degrees.

ROBERT JOHNSTONE STIRLING.

Witnesses:
SAMUEL GRIFFITHS WELLS,
WILLIAM THOMPSON.